(12) United States Patent
Ji et al.

(10) Patent No.: US 10,619,709 B2
(45) Date of Patent: Apr. 14, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Seongwook Ji, Gunpo-si (KR); Hyun Sik Kwon, Seoul (KR); Wonmin Cho, Hwaseong-si (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 15/953,645

(22) Filed: Apr. 16, 2018

(65) Prior Publication Data
US 2019/0170218 A1    Jun. 6, 2019

(30) Foreign Application Priority Data
Dec. 5, 2017  (KR) .......................... 10-2017-0165917

(51) Int. Cl.
*F16H 3/66*      (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ............... F16H 3/66; F16H 2200/2012; F16H 2200/2046; F16H 2200/0069
See application file for complete search history.

(56) References Cited

U.S. PATENT DOCUMENTS

| | | | | |
|---|---|---|---|---|
| 6,634,980 B1 * | 10/2003 | Ziemer | ..................... | F16H 3/66 475/275 |
| 9,556,937 B1 * | 1/2017 | Kwon | ....................... | F16H 3/66 |
| 9,856,951 B2 * | 1/2018 | Cho | .......................... | F16H 3/66 |
| 2007/0060439 A1 * | 3/2007 | Kamada | .................... | F16H 3/66 475/284 |

FOREIGN PATENT DOCUMENTS

CN           106812878 A  *  6/2017  ............... F16H 3/66

* cited by examiner

*Primary Examiner* — Stacey A Fluhart
(74) *Attorney, Agent, or Firm* — Morgan, Lewis & Bockius LLP

(57) ABSTRACT

A planetary gear train of an automatic transmission may include input and output shafts, first to fourth planetary gear sets respectively having first to third, fourth to sixth, seventh to ninth, and tenth to twelfth elements, a first shaft fixed with the input shaft, the third element, and the fifth element, a second shaft fixed with the ninth and eleventh elements, and selectively connectable to the input shaft, a third shaft fixed with the eighth and twelfth elements, and the output shaft, a fourth shaft fixed with the first element, a fifth shaft fixed with the second and sixth elements, a sixth shaft fixed with the tenth element, and a plurality of shafts, each of which is selectively connectable to a housing and fixed to an element of the first and second gear sets which is not fixed with any of the first to sixth shafts.

9 Claims, 2 Drawing Sheets

FIG. 2

| Shift-stage | Engagement element | | | | | | Gear ratio |
|---|---|---|---|---|---|---|---|
| | C1 | C2 | C3 | C4 | B1 | B2 | |
| D1 |  | ● | ● |  |  | ● | 5.526 |
| D2 |  |  | ● |  | ● | ● | 3.480 |
| D3 |  | ● |  |  | ● | ● | 2.610 |
| D4 | ● |  |  |  | ● | ● | 2.053 |
| D5 | ● | ● |  |  | ● |  | 1.512 |
| D6 | ● |  | ● |  | ● |  | 1.217 |
| D7 | ● |  | ● | ● |  |  | 1.000 |
| D8 | ● |  |  | ● | ● |  | 0.768 |
| D9 |  |  | ● | ● | ● |  | 0.630 |
| D10 |  | ● |  | ● | ● |  | 0.594 |
| REV |  | ● |  | ● |  | ● | -6.140 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0165917 filed on Dec. 5, 2017, the entire contents of which is incorporated herein for all purposes by this reference.

BACKGROUND OF THE INVENTION

Field of the Invention

The present invention relates to an automatic transmission for a vehicle.

Description of Related Art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shift stages.

To achieve more shift stages for an automatic transmission, the number of parts is typically increased, which may deteriorate installability, production cost, weight and/or power flow efficiency.

Therefore, to maximally enhance fuel consumption of an automatic transmission having more shift stages, it is important for better efficiency to be derived by fewer number of parts.

In this respect, an eight-speed automatic transmission has been recently introduced, and a planetary gear train for an automatic transmission facilitating more shift stages is under investigation.

An automatic transmission of eight or more shift-stages typically includes three to four planetary gear sets and five to seven engagement elements (friction elements), and may easily become lengthy, deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least ten forward speeds, providing better performance and fuel efficiency of a vehicle.

An exemplary planetary gear train of an automatic transmission for a vehicle may include an input shaft receiving an input torque, an output shaft outputting a shifted torque, a first planetary gear set having first, second, and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, a first shaft fixedly connected to the input shaft, the third rotation element, and the fifth rotation element, a second shaft fixedly connected to the ninth rotation element and the eleventh rotation element, and selectively connectable to the input shaft, a third shaft fixedly connected to the eighth rotation element, the twelfth rotation element, and the output shaft, a fourth shaft fixedly connected to the first rotation element, a fifth shaft fixedly connected to the second rotation element and the sixth rotation element, a sixth shaft fixedly connected to the tenth rotation element, and a plurality of shafts, each of which is selectively connectable to the transmission housing and fixedly connected to a rotation element of the first and second planetary gear sets which is not fixedly connected to any of the first to sixth shafts.

The plurality of shafts may include a seventh shaft fixedly connected to the fourth rotation element and selectively connectable to the transmission housing, and an eighth shaft fixedly connected to the seventh rotation element and selectively connectable to the transmission housing. The input shaft and the second shaft, the fourth shaft and the sixth shaft, the fifth shaft and the sixth shaft, and the fifth shaft and the eighth shaft may be selectively connectable to each other, respectively.

The planetary gear train may further include four clutches each selectively interconnecting a corresponding pair among the input shaft and the first to eighth shafts, and two brakes selectively connecting the seventh shaft and the eighth shaft with the transmission housing respectively.

The four clutches may include a first clutch disposed between the input shaft and the second shaft, a second clutch disposed between the fourth shaft and the sixth shaft, a third clutch disposed between the fifth shaft and the sixth shaft, and a fourth clutch disposed between the fifth shaft and the eighth shaft, and The two brakes may include a first brake disposed between the seventh shaft and the transmission housing, and a second brake disposed between the eighth shaft and the transmission housing.

The first planetary gear set may be a single pinion planetary gear set having a first sun gear, a first planet carrier, and a first ring gear as the first, second, and third rotation elements, respectively. The second planetary gear set may be a single pinion planetary gear set having a second sun gear, a second planet carrier, and a second ring gear as the fourth, fifth, and sixth rotation elements, respectively. The third planetary gear set may be a single pinion planetary gear set having a third sun gear, a third planet carrier, and a third ring gear as the seventh, eighth, and ninth rotation elements, respectively. The fourth planetary gear set may be a single pinion planetary gear set having a fourth sun gear, a fourth planet carrier, and a fourth ring gear as the tenth, eleventh, and twelfth rotation elements, respectively.

A planetary gear train according to an exemplary embodiment of the present invention may realize ten forward speeds and one reverse speed by operating the four planetary gear sets by controlling the four clutches and the two brakes.

Furthermore, a planetary gear train according to an exemplary embodiment of the present invention may substantially improve driving stability by realizing shift-stages appropriate for rotation speed of an engine due to multi-stages of an automatic transmission.

Furthermore, a planetary gear train according to an exemplary embodiment of the present invention maximize engine driving efficiency by multi-stages of an automatic transmission, and may improve power delivery performance and fuel consumption.

Furthermore, effects that may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages applicable to a planetary gear train according to an exemplary embodiment of the present invention.

Figure 1:
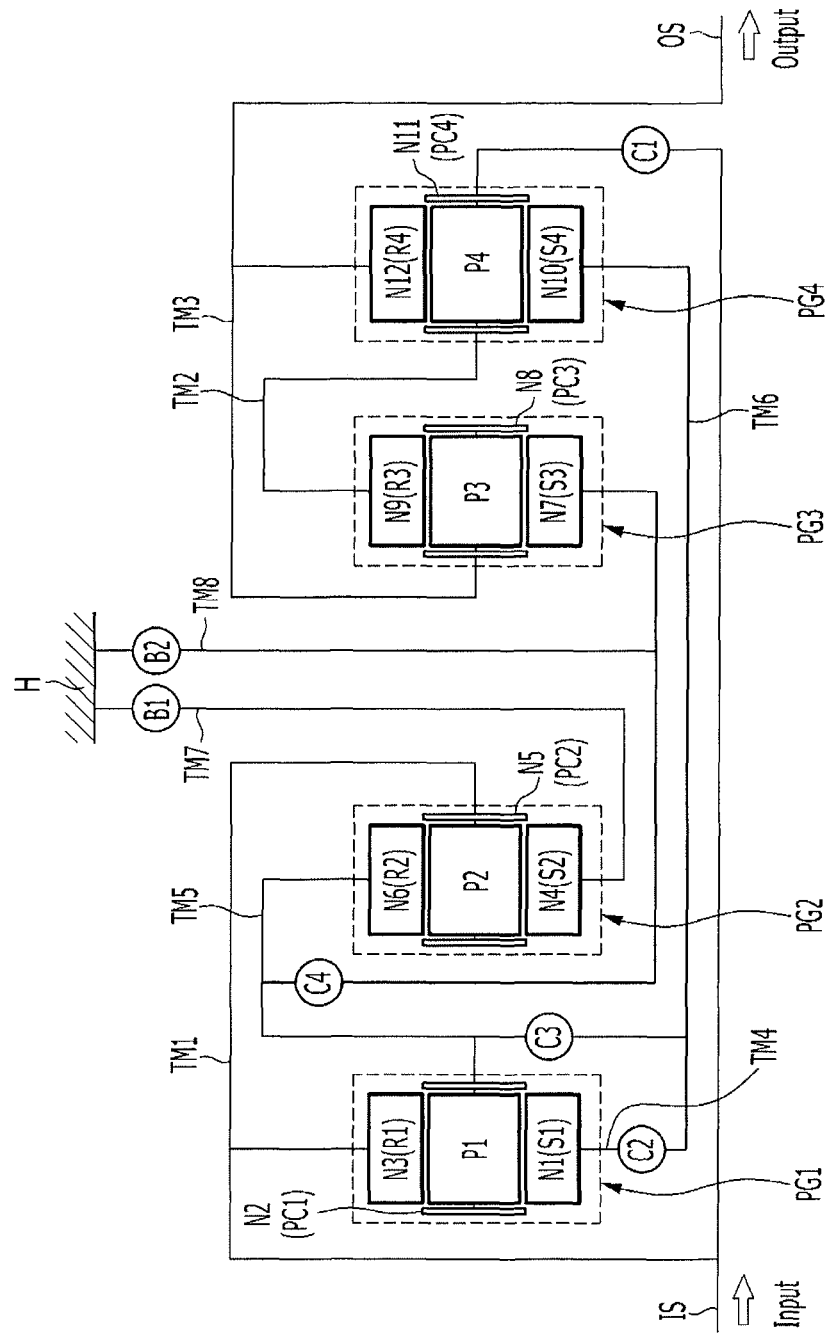
FIG. 1 is a schematic diagram of a planetary gear train according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third and fourth planetary gear sets PG1, PG2, PG3, and PG4 disposed on a same axis, an input shaft IS, an output shaft OS, eight shafts TM1 to TM8 interconnecting rotation elements of the first, second, third, fourth, and fifth planetary gear sets PG1, PG2, PG3, PG4, and PG5, engagement elements of four clutches C1 to C4 and two brakes B1 and B2, and a transmission housing H.

Torque input from the input shaft IS is shifted by cooperative operation of the first, second, third and fourth planetary gear sets PG1, PG2, PG3, and PG4, and then output through the output shaft OS.

In an exemplary embodiment of the present invention, the planetary gear sets are disposed in the order of the first, second, third and fourth planetary gear sets PG1, PG2, PG3, and PG4, from an engine side thereof.

The input shaft IS is an input member and may receive a torque from a crankshaft of an engine through a torque converter.

The output shaft OS is an output element disposed on a same axis with the input shaft IS, and outputs a shifted driving torque to a driveshaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear acts as a tenth rotation element N10, the fourth planet carrier PC4 acts as an eleventh rotation element N11, and the fourth ring gear R4 acts as a twelfth rotation element N12.

In the arrangement of the first, second, third and fourth planetary gear sets PG1, PG2, PG3, and PG4, the second rotation element N2 is fixedly connected to the sixth rotation element N6, the third rotation element N3 is fixedly connected to the fifth rotation element N5, the eighth rotation element N8 is fixedly connected to the twelfth rotation element N12, the ninth rotation element N9 is fixedly connected to the eleventh rotation element N11, forming eight shafts TM1 to TM8.

The eight shafts TM1 to TM8 are hereinafter described more specifically.

The first shaft TM1 is fixedly connected to third rotation element N3 (first ring gear R1) and fifth rotation element N5 (second planet carrier PC2), and fixedly connected to the input shaft IS, always acting as an input element.

The second shaft TM2 is fixedly connected to ninth rotation element N9 (third ring gear R3) and eleventh rotation element N11 (fourth planet carrier PC4), and selectively connectable to the input shaft IS selectively acting as an input element.

The third shaft TM3 is fixedly connected to eighth rotation element N8 (third planet carrier PC3) and twelfth rotation element N12 (fourth ring gear R4), and fixedly connected to the output shaft OS always acting as an output element.

The fourth shaft TM4 is fixedly connected to the first rotation element N1 (first sun gear S1).

The fifth shaft TM5 is fixedly connected to second rotation element N2 (first planet carrier PC1) and the sixth rotation element N6 (second ring gear R2).

The sixth shaft TM6 is fixedly connected to the tenth rotation element N10 (fourth sun gear S4).

The seventh shaft TM7 is fixedly connected to the fourth rotation element N4 (second sun gear S2).

The eighth shaft TM8 is fixedly connected to the seventh rotation element N7 (third sun gear S3).

Each of the eight shafts TM1 to TM8 may be a rotation member that fixedly interconnects the input and output shafts and rotation elements of the planetary gear sets PG1, PG2, PG3, and PG4, or may be a rotation member that selectively interconnects a rotation element to the transmission housing H, or may be a fixed member fixed to the transmission housing H.

In the disclosure, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotates separately when the engagement element is not engaged, and rotates at a same speed when the engagement element is engaged. It may be understood that in the case that a member is "selectively connectable" with a transmission housing by an engagement element, the member may be stationary when the engagement element is engaged.

The second shaft TM2 is selectively connectable to the input shaft IS, the fourth shaft TM4 is selectively connectable to the sixth shaft TM6, the fifth shaft TM5 is selectively connectable to the sixth shaft TM6, and the fifth shaft TM5 is selectively connectable to the eighth shaft TM8.

Furthermore, the seventh shaft TM7 and the eighth shaft TM8 are selectively connectable to the transmission housing H, selectively acting as a fixed element.

The engagement elements of four clutches C1, C2, C3, and C4 are disposed between the eight shafts TM1 to TM8, the input shaft IS, and the output shaft OS, to form selective connections.

The eight shafts TM1 to TM8 may be selectively connectable to the transmission housing H, by control elements of two brakes B1 and B2.

The six engagement elements of the four clutches C1 to C4 and the two brakes B1 and B2 are disposed as follows.

The first clutch C1 is disposed between the input shaft IS and the second shaft TM2, and selectively connects the input shaft IS and the second shaft TM2, controlling power delivery therebetween.

The second clutch C2 is disposed between the fourth shaft TM4 and the sixth shaft TM6, and selectively connects the fourth shaft TM4 and the sixth shaft TM6, controlling power delivery therebetween.

The third clutch C3 is disposed between the fifth shaft TM5 and the sixth shaft TM6, and selectively connects the fifth shaft TM5 and the sixth shaft TM6, controlling power delivery therebetween.

The fourth clutch C4 is disposed between the fifth shaft TM5 and the eighth shaft TM8, and selectively connects the fifth shaft TM5 and the eighth shaft TM8, controlling power delivery therebetween.

The first brake B1 is disposed between the seventh shaft TM7 and the transmission housing H, and selectively connects the seventh shaft TM7 to the transmission housing H.

The second brake B2 is disposed between the eighth shaft TM8 and the transmission housing H, and selectively connects the eighth shaft TM8 to the transmission housing H.

The engagement elements of the first, second, third and fourth clutches C1, C2, C3, and C4 and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

FIG. 2 is an operational chart for respective control elements at respective shift-stages applicable to a planetary gear train according to an exemplary embodiment of the present invention.

Referring to FIG. 2, a planetary gear train according to an exemplary embodiment of the present invention realizes shifting between ten forward speeds and one reverse speed by operating three elements among the engagement elements of the first, second, third and fourth clutches C1, C2, C3, and C4 and the first and second brakes B1 and B2.

In the first forward speed D1, the second and third clutches C2 and C3 and the second brake B2 are simultaneously operated.

As a result, the fourth shaft TM4 and the sixth shaft TM6 are connected by the operation of the second clutch C2, and the fifth shaft TM5 and the sixth shaft TM6 are connected by the operation of the third clutch C3. In the present state, the input torque is input to the first shaft TM1.

Furthermore, the eighth shaft TM8 acts as a fixed element by the operation of the second brake B2, realizing the first forward speed and outputting a shifted torque to the output shaft OS connected to the third shaft TM3.

In the second forward speed D2, the third clutch C3 and the first and second brakes B1 and B2 are simultaneously operated.

As a result, the fifth shaft TM5 and the sixth shaft TM6 are connected by the operation of the third clutch C3. In the present state, the input torque is input to the first shaft TM1.

Furthermore, the seventh and eighth shafts TM7 and TM8 act as fixed elements by the operation of the first and second brakes B1 and B2, realizing the second forward speed and outputting a shifted torque to the output shaft OS connected to the third shaft TM3.

In the third forward speed D3, the second clutch C2 and the first and second brakes B1 and B2 are simultaneously operated.

As a result, the fourth shaft TM4 and the sixth shaft TM6 are connected by the operation of the second clutch C2. In the present state, the input torque is input to the first shaft TM1.

Furthermore, the seventh and eighth shafts TM7 and TM8 act as fixed elements by the operation of the first and second brakes B1 and B2, realizing the third forward speed and outputting a shifted torque to the output shaft OS connected to the third shaft TM3.

In the fourth forward speed D4, the first clutch C1 and the first and second brakes B1 and B2 are simultaneously operated.

As a result, the input shaft IS and the second shaft TM2 are connected by the operation of the first clutch C1. In the present state, the input torque is input to the first shaft TM1 and the second shaft TM2.

Furthermore, the seventh and eighth shafts TM7 and TM8 act as fixed elements by the operation of the first and second brakes B1 and B2, realizing the fourth forward speed and outputting a shifted torque to the output shaft OS connected to the third shaft TM3.

In the fifth forward speed D5, the first and second clutch C1 and C2 and the first brake B1 are simultaneously operated.

As a result, the input shaft IS and the second shaft TM2 are connected by the operation of the first clutch C1, and the fourth shaft TM4 and the sixth shaft TM6 are connected by the operation of the second clutch C2. In the present state, the input torque is input to the first shaft TM1 and the second shaft TM2.

Furthermore, the seventh shaft TM7 acts as a fixed element by the operation of the first brake B1, realizing the fifth forward speed and outputting a shifted torque to the output shaft OS connected to the third shaft TM3.

In the sixth forward speed D6, the first and third clutches C1 and C3 and the first brake B1 are simultaneously operated.

As a result, the input shaft IS and the second shaft TM2 are connected by the operation of the first clutch C1, and the fifth shaft TM5 and the sixth shaft TM6 are connected by the operation of the third clutch C3. In the present state, the input torque is input to the first shaft TM1 and the second shaft TM2.

Furthermore, the seventh shaft TM7 acts as a fixed element by the operation of the first brake B1, realizing the sixth forward speed and outputting a shifted torque to the output shaft OS connected to the third shaft TM3.

In the seventh forward speed D7, the first, third, and fourth clutches C1, C3, and C4 are simultaneously operated.

As a result, the input shaft IS and the second shaft TM2 are connected by the operation of the first clutch C1, the fifth shaft TM5 and the sixth shaft TM6 are connected by the operation of the third clutch C3, and the fifth shaft TM5 and the eighth shaft TM8 are connected by the operation of the fourth clutch C4.

As such, the first, second, third and fourth planetary gear sets PG1, PG2, PG3, and PG4 integrally rotate, and the input torque is input to the first shaft TM1 and second shaft TM2, realizing the seventh speed where a torque is output as inputted, and outputting a shifted torque to the output shaft OS connected to the third shaft TM3.

In the eighth forward speed D8, the first and fourth clutches C1 and C4 and the first brake B1 are simultaneously operated.

As a result, the input shaft IS and the second shaft TM2 are connected by the operation of the first clutch C1, and the fifth shaft TM5 and the eighth shaft TM8 are connected by the operation of the fourth clutch C4. In the present state, the input torque is input to the first shaft TM1 and the second shaft TM2.

Furthermore, the seventh shaft TM7 acts as a fixed element by the operation of the first brake B1, realizing the eighth forward speed and outputting a shifted torque to the output shaft OS connected to the third shaft TM3.

In the ninth forward speed D9, the third and fourth clutches C3 and C4 and the first brake B1 are simultaneously operated.

As a result, the fifth shaft TM5 and the sixth shaft TM6 are connected by the operation of the third clutch C3, and the fifth shaft TM5 and the eighth shaft TM8 are connected by the operation of the fourth clutch C4. In the present state, the input torque is input to the first shaft TM1.

Furthermore, the seventh shaft TM7 acts as a fixed element by the operation of the first brake B1, realizing the ninth forward speed and outputting a shifted torque to the output shaft OS connected to the third shaft TM3.

In the tenth forward speed D10, the second and fourth clutches C2 and C4 and the first brake B1 are simultaneously operated.

As a result, the fourth shaft TM4 and the sixth shaft TM6 are connected by the operation of the second clutch C2, and the fifth shaft TM5 and the eighth shaft TM8 are connected by the operation of the fourth clutch C4. In the present state, the input torque is input to the first shaft TM1.

Furthermore, the seventh shaft TM7 acts as a fixed element by the operation of the first brake B1, realizing the tenth forward speed and outputting a shifted torque to the output shaft OS connected to the third shaft TM3.

In the reverse speed REV, the second and fourth clutches C2 and C4 and the second brake B2 are simultaneously operated.

As a result, the fourth shaft TM4 and the sixth shaft TM6 are connected by the operation of the second clutch C2, and the fifth shaft TM5 and the eighth shaft TM8 are connected by the operation of the fourth clutch C4. In the present state, the input torque is input to the first shaft TM1.

Furthermore, the eighth shaft TM8 acts as a fixed element by the operation of the second brake B2, forming the reverse speed and outputting a shifted torque to the output shaft OS connected to the third shaft TM3.

As described above, a planetary gear train according to an exemplary embodiment of the present invention may realize ten forward speeds and one reverse speed by operating the four planetary gear sets PG1, PG2, PG3, and PG4 by controlling the four clutches C1, C2, C3, and C4 and the two brakes B1 and B2.

Furthermore, a large number of shift-stages are realized, and an engine speed may be maintained at a low speed by facilitating an optimal shift-stage, improving N.V.H. characteristic of a vehicle.

Furthermore, a planetary gear train according to an exemplary embodiment of the present invention maximize engine driving efficiency by multi-stages of an automatic transmission, and may improve power delivery performance and fuel consumption.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the apparatus comprising:
   an input shaft receiving an input torque;
   an output shaft outputting a shifted torque;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary sear set having a tenth rotation element, an eleventh rotation element, and a twelfth rotation element;
   a first shaft fixedly connected to the input shaft, the third rotation element, and the fifth rotation element;
   a second shaft fixedly connected to the ninth rotation element and the eleventh rotation element, and selectively connectable to the input shaft;
   a third shaft fixedly connected to the eighth rotation element, the twelfth rotation element, and the output shaft;
   a fourth shaft fixedly connected to the first rotation element;
   a fifth shaft fixedly connected to the second rotation element and the sixth rotation element;
   a sixth shaft fixedly connected to the tenth rotation element; and
   a plurality of shafts, each of which is selectively connectable to a transmission housing and fixedly connected to a rotation element of the second and third planetary gear sets which is not fixedly connected to the first to sixth shafts,
   wherein the plurality of shafts includes:
      a seventh shaft fixedly connected to the fourth rotation element and selectively connectable to the transmission housing; and
      an eighth shaft fixedly connected to the seventh rotation element and selectively connectable to the transmission housing, and
   wherein the input shaft and the second shaft are selectively connectable to each other, the fourth shaft and the sixth shaft are selectively connectable to each other, the fifth shaft and the sixth shaft are selectively connectable to each other, and the fifth shaft and the eighth shaft are selectively connectable to each other.

2. The planetary gear set of claim 1, further including:
   four clutches each selectively interconnecting a corresponding pair among the input shaft and the first to eighth shafts; and
   two brakes selectively connecting the seventh shaft and the transmission housing and selectively connecting the eighth shaft with the transmission housing, respectively.

3. The planetary gear set of claim 2, wherein
   the four clutches comprise:
   a first clutch mounted between the input shaft and the second shaft;
   a second clutch mounted between the fourth shaft and the sixth shaft;
   a third clutch mounted between the fifth shaft and the sixth shaft; and
   a fourth clutch mounted between the fifth shaft and the eighth shaft, and
   the two brakes comprise
   a first brake mounted between the seventh shaft and the transmission housing; and
   a second brake mounted between the eighth shaft and the transmission housing.

4. A planetary gear train apparatus of an automatic transmission for a vehicle, the apparatus comprising:
   an input shaft receiving an input torque;
   an output shaft outputting a shifted torque;
   a first planetary gear set having a first rotation element a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   a first shaft fixedly connected to the input shaft, the third rotation element, and the fifth rotation element;
   a second shaft fixedly connected to the ninth rotation element and the eleventh rotation element, and selectively connectable to the input shaft;
   a third shaft fixedly connected to the eighth rotation element, the twelfth rotation element and the output shaft;
   a fourth shaft fixedly connected to the first rotation element;
   a fifth shaft fixedly connected to the second rotation element and the sixth rotation element;
   a sixth shaft fixedly connected to the tenth rotation element; and
   a plurality of shafts, each of which is selectively connectable to a transmission housing and fixedly connected to a rotation element of the second and third planetary gear sets which is not fixedly connected to the first to sixth shafts,
   wherein the first planetary gear set is a single pinion planetary gear set having a first sun gear, a first planet carrier, and a first ring gear as the first rotation element, the second rotation element, and the third rotation element, respectively;
   wherein the second planetary gear set is a single pinion planetary gear set having a second sun gear, a second planet carrier, and a second ring gear as the fourth rotation element, the fifth rotation element, and the sixth rotation element, respectively;

wherein the third planetary gear set is a single pinion planetary gear set having a third sun gear, a third planet carrier, and a third ring gear as the seventh rotation element, the eighth rotation element, and the ninth rotation element, respectively; and wherein the fourth planetary gear set is a single pinion planetary gear set having a fourth sun gear, a fourth planet carrier, and a fourth ring gear as the tenth rotation element, the eleventh rotation element, and the twelfth rotation element, respectively.

5. A planetary gear train apparatus of an automatic transmission for a vehicle, the apparatus comprising:
an input shaft receiving an input torque;
an output shaft outputting a shifted torque;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element;
a fourth planetary gear set having a tenth rotation element, an eleventh rotation element, and a twelfth rotation element,
wherein the first rotation element is selectively connectable to the tenth rotation element,
the second rotation element is fixedly connected to the sixth rotation element, and selectively connectable to the seventh rotation element and the tenth rotation element, respectively,
the third rotation element is fixedly connected to the fifth rotation element and the input shaft,
the fourth rotation element and the seventh rotation element are selectively connectable to a transmission housing respectively,
the eighth rotation element is fixedly connected to the twelfth rotation element and the output shaft,
the ninth rotation element is fixedly connected to the eleventh rotation element, and selectively connectable to the input shaft.

6. The planetary gear set of claim 5, further including:
four clutches each selectively interconnecting a corresponding pair among the input shaft and the first to eighth rotation elements; and
two brakes selectively connecting the fourth rotation element and the seventh rotation element to the transmission housing respectively.

7. The planetary gear set of claim 6, wherein
the four clutches comprise:
a first clutch mounted between the input shaft and the eleventh rotation element;
a second clutch mounted between the first rotation element and the tenth rotation element;
a third clutch mounted between the second rotation element and the tenth rotation element; and
a fourth clutch mounted between the sixth rotation element and the seventh rotation element,
the two brakes comprise:
a first brake mounted between the fourth rotation element and the transmission housing; and
a second brake mounted between the seventh rotation element and the transmission housing.

8. The planetary gear set of claim 7, wherein the fourth clutch is mounted between the second rotation element and the seventh rotation element.

9. The planetary gear set of claim 5, wherein
the first planetary gear set is a single pinion planetary gear set having a first sun gear, a first planet carrier, and a first ring gear as the first rotation element, the second rotation element, and the third rotation element, respectively;
the second planetary gear set is a single pinion planetary gear set having a second sun gear, a second planet carrier, and a second ring gear as the fourth rotation element, the fifth rotation element, and the sixth rotation element, respectively;
the third planetary gear set is a single pinion planetary gear set having a third sun gear, a third planet carrier, and a third ring gear as the seventh rotation element, the eighth rotation element, and the ninth rotation element, respectively; and
the fourth planetary gear set is a single pinion planetary gear set having a fourth sun gear, a fourth planet carrier, and a fourth ring gear as the tenth rotation element, the eleventh rotation element, and the twelfth rotation element, respectively.

* * * * *